US005542706A

United States Patent [19]

Kubly

[11] Patent Number: 5,542,706
[45] Date of Patent: Aug. 6, 1996

[54] MOTOR VEHICLE FUEL SYSTEM

[75] Inventor: Kris D. Kubly, New Glarus, Wis.

[73] Assignee: Safety Engineering Associates, Inc., Madison, Wis.

[21] Appl. No.: 371,162

[22] Filed: Jan. 11, 1995

[51] Int. Cl.$^6$ .......................... B60K 15/01; B60K 15/03; B65D 90/32
[52] U.S. Cl. .......................... 280/833; 280/835; 220/89.1; 137/589; 137/67
[58] Field of Search .................... 280/835, 833, 280/830; 220/89.1; 137/589, 590, 67

[56] References Cited

U.S. PATENT DOCUMENTS

| 3,071,285 | 1/1963 | Friend | 220/203.18 |
|---|---|---|---|
| 3,187,935 | 6/1965 | Lense | 220/86.2 |
| 3,633,609 | 1/1972 | Benner et al. | 137/351 |
| 3,643,690 | 2/1972 | Sarai | 137/587 |
| 3,653,537 | 4/1972 | Shiobara et al. | 220/746 |
| 3,692,051 | 9/1972 | Eyb | 137/544 |
| 3,695,480 | 10/1972 | Castiglia | 220/376 |
| 3,757,987 | 9/1973 | Marshall | 220/203.2 |
| 3,802,596 | 4/1974 | Schmidt | 220/746 |
| 3,845,876 | 11/1974 | Needham et al. | 220/203.29 |
| 3,937,358 | 2/1976 | Smith et al. | 220/203.18 |
| 4,000,828 | 1/1977 | Crute et al. | 220/203.2 |
| 4,051,975 | 10/1977 | Ohgida et al. | 220/203.18 |
| 4,068,859 | 1/1978 | Dittman | 280/304.4 |
| 4,099,645 | 7/1978 | Muth et al. | 220/304 |
| 4,162,021 | 7/1979 | Crute | 220/202 |
| 4,312,649 | 1/1982 | Fujii et al. | 96/109 |
| 4,358,023 | 11/1982 | Fakuta | 220/203.18 |
| 4,392,583 | 7/1983 | Wong | 220/203.18 |
| 4,423,746 | 1/1984 | Scheurenbrand et al. | 137/43 |
| 4,444,333 | 6/1984 | Anhegger | 220/746 |
| 4,457,325 | 7/1984 | Green | 137/39 |
| 4,457,443 | 7/1984 | Casimir et al. | 220/746 |
| 4,458,824 | 7/1984 | Baker et al. | 220/315 |
| 4,526,216 | 7/1985 | Lake, Jr. | 141/348 |
| 4,531,653 | 7/1985 | Sakata | 220/746 |
| 4,561,559 | 12/1985 | Rutan et al. | 220/203.26 |
| 4,717,163 | 1/1988 | Tsukiji | 280/835 |
| 4,982,861 | 1/1991 | de Groot et al. | 220/89.1 |
| 5,012,945 | 5/1991 | Keenan | 220/89.1 |

FOREIGN PATENT DOCUMENTS

| 0151726 | 11/1979 | Japan | 280/835 |
|---|---|---|---|
| 0014986 | 1/1990 | Japan | 280/835 |
| 0241886 | 9/1990 | Japan | 280/835 |

Primary Examiner—Margaret A. Focarino
Assistant Examiner—F. Zeender
Attorney, Agent, or Firm—Foley & Lardner

[57] ABSTRACT

An improved fuel system for motor vehicles, such as motorcycles, including a fuel tank having a fueling port and a separate relief port, a cap which is adapted for closing and sealing the fueling port, a pressure relief valve for closing and opening the relief port, and a conduit for directing fuel from the relief port to a location which is away from a rider of the vehicle. The pressure relief valve has an inner orifice which is normally closed, but opens to allow fuel to flow from the tank through the conduit when the pressure within the tank exceeds a predetermined super-atmospheric level, for example, during a collision. The fuel system also provides for venting of air into the tank as fuel is consumed.

22 Claims, 3 Drawing Sheets

MOTOR VEHICLE FUEL SYSTEM

FIELD OF THE INVENTION

This invention pertains generally to fuel systems for motor vehicles such as motorcycles, and particularly to fuel systems which vent the fuel tank.

BACKGROUND OF THE INVENTION

Motorcycles and certain other motor vehicles, by their very nature, have fuel system components which are exposed to damage by collision to a much greater degree than most other on-road vehicles. Since the fuel system components, and especially the fuel tank, are exposed to possible collision damage and are in close proximity to the rider, it is desirable to reduce the risk resulting from fuel loss from the fuel system due to collision.

The conventional mounting location for the fuel tank on a motorcycle is directly in front of the rider. Since a frontal impact is the most common type of motorcycle collision, rider ejection toward the front of the vehicle is common. This sometimes results in impact between the rider and the fuel tank. In addition, fuel can be forced toward the front portion of the fuel tank during a collision due to rapid deceleration of the vehicle.

Motorcycle fuel tanks commonly have fuel filler caps having a vent and a relief valve. The relief valve, which is designed to open at low pressure, prevents internal tank pressure from increasing due to heat, pressure surges resulting from deceleration, or fuel tank deformation resulting from collision with another vehicle or a fixed object or contact with the rider during collision or ejection. Thus, when pressure increases within the tank, fuel often exits the filler cap through the pressure relief valve. If the increase of pressure within the fuel tank is due to a front end collision, the ejection path of the motorcycle rider often passes through the fuel exiting the fuel tank through the pressure relief valve located in front of the rider.

The discharge of fuel onto the rider during an accident increases the risk that the rider will be burned if the fuel lost from the tank catches fire. The risk of fire is increased by the fact that the fuel tank is often located directly above hot engine parts and near electrical components.

Some motorcycle engine-frame configurations have a fuel tank which is positioned below the rider, where it is partially protected by the motorcycle frame. If these tanks are crushed, fuel may also be directed through the filling cap pressure relief valve upwardly toward the rider.

The vent on the fuel filler cap helps to maintain atmospheric pressure inside the tank as fuel is consumed during use of the motorcycle. Many existing vent designs also, however, allow fuel to flow outwardly from the tank when the vehicle falls onto its side, or when internal fuel tank pressure rises.

SUMMARY OF THE INVENTION

The present invention provides a fuel system for motor vehicles having fuel system components exposed to a rider, such as motorcycles and all-terrain vehicles, which directs fuel from the fuel tank away from the rider when the fuel in the tank is under unusual pressure, as in collisions. As in previous fuel systems, the present fuel system provides for venting of the fuel tank so that air can enter the interior of the tank to replace fuel which has been consumed. The fuel system includes a fuel tank having a fueling port and a separate relief port, a cap which is adapted for closing and sealing the fueling port—preferably without a pressure relief valve at the cap—, a pressure relief valve which regulates the opening and closing of the relief port, and a conduit for directing fuel from the relief port to a position away from the rider of the vehicle.

The pressure relief valve normally closes a relief port. When pressure within the tank exceeds a predetermined level, the valve opens to allow fuel to flow from the tank. This fuel is then directed by a conduit from the relief port away from the fuel tank and rider.

The conduit may include a hose which is connected at one end to the relief port and at its outlet end to the vehicle in a position which is away from the rider, from the most probable collision ejection paths of the rider, and from any hot vehicle parts which might ignite the fuel. The improved fuel system may also include a remote reservoir to which the outlet end of the fuel directing hose is connected so that fuel which is expelled from the fuel tank through the relief valve flows through the hose into the remote reservoir.

Preferably, the improved fuel system also includes a vent pipe. One end of the vent pipe opens at a small aperture in the conduit leading from the pressure relief valve. The other end is located above the fuel fill line, in the airspace within the fuel tank, and includes a one-way valve which allows flow in only one direction in the pipe, from the conduit into the tank, so that atmospheric pressure inside the tank is maintained as fuel is consumed and outside air is drawn into the tank, but fuel cannot pass out through the valve. By using this venting structure, the conventional vent in the filler cap can be eliminated so that fuel cannot escape from the filler cap toward a rider during a collision or when the motorcycle is tipped on its side.

Further objects, features, and advantages of the invention will be apparent from the following detailed description when taken in conjunction with the accompanying drawings.

DETAILED DESCRIPTION OF THE INVENTION

Figure 1:
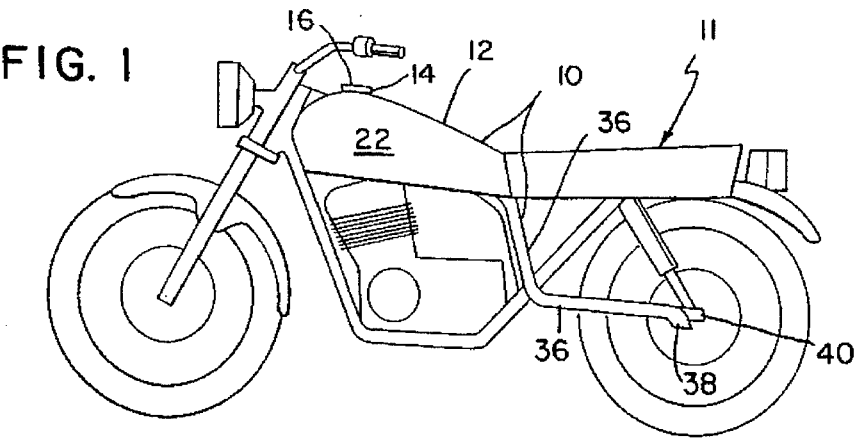
FIG. 1 is a side view of a motorcycle having the improved fuel system of the present invention.
Figure 2:
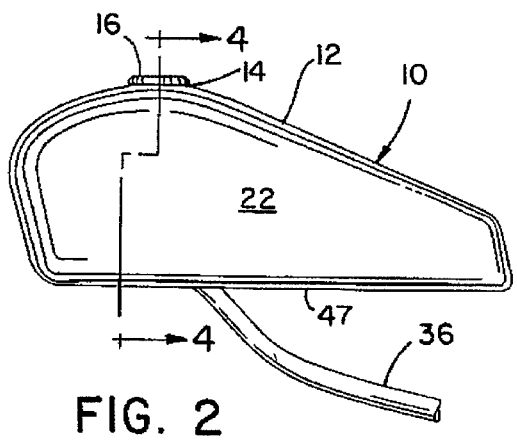
FIG. 2 is a side view of the improved fuel system which has been adapted for a saddle-type fuel tank.
Figure 3:
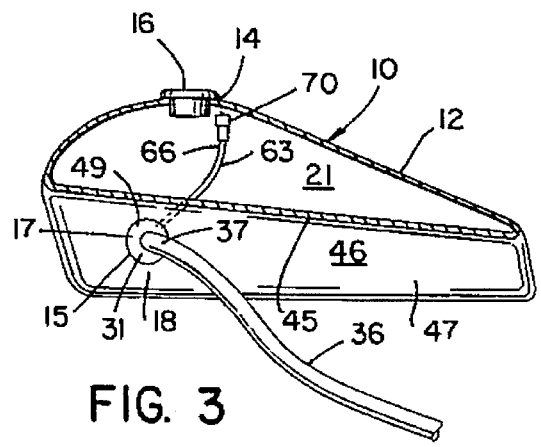
FIG. 3 is a longitudinal cross-sectional view of the improved fuel system shown in FIG. 2.
Figure 4:
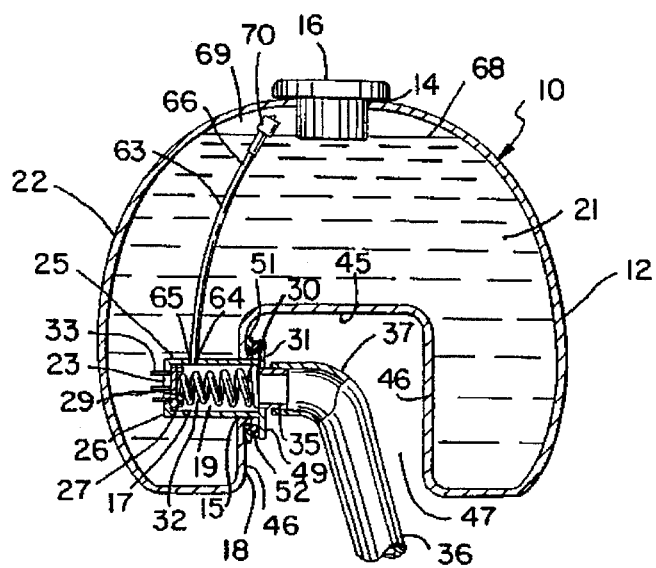
FIG. 4 is a cross-sectional view of the improved fuel system shown in FIG. 2 taken generally along the line 4—4 of FIG. 2.

With reference to the drawings, an improved fuel system 10 in accordance with the invention is shown incorporated on a motorcycle 11 in FIG. 1. FIG. 2 shows the fuel system 10 alone and FIG. 3 shows the fuel system 10 with a saddle-type fuel tank 12, in longitudinal cross-section, of the type that is mounted to the frame of the motorcycle 11 above the motorcycle engine 13. The motorcycle may be of standard construction, having front and rear wheels mounted to a frame and a seat behind the tank 12. FIG. 4 shows the fuel system 10 with the saddle-type fuel tank 12 in lateral cross-section. The improved fuel system includes a fuel tank 12 having a fueling port 14 and a separate relief port 15, a filler cap 16 which is adapted for closing and sealing the fueling port 14, a pressure relief valve 17 which is sealed to a wall 18 of the fuel tank 12 around the relief port 15, and a conduit 20 connected to the pressure relief valve 17 for directing fuel from the valve 17 to a position away from a rider of the motorcycle 11.

The body of the pressure relief valve 17, in conjunction with the relief port 15, defines a passageway portion 19 of the conduit 20 which connects the interior 21 and the exterior 22 of the tank 12. The pressure relief valve 17 has an inner orifice 23 which normally is closed, but is opened to allow fuel to flow from the tank 12 through the pressure relief valve passageway 19 to the tank exterior 22 when pressure within the tank 12 exceeds a predetermined superatmospheric level.

Figure 5:
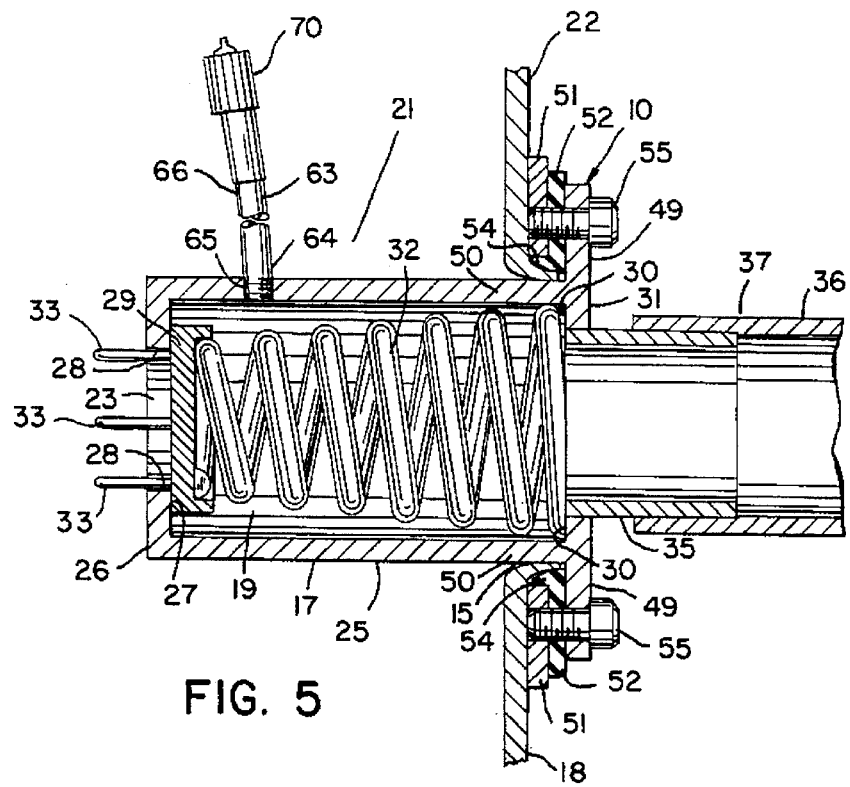
FIG. 5 is a more detailed view of the pressure relief valve secured to the wall of the fuel tank which is shown in cross-section in FIG. 4.

A preferred embodiment of the pressure relief valve 17, shown in detail in FIG. 5, includes a cylindrical body portion 25 which is axially aligned with a central axis of the relief port 15. Within the cylindrical portion 25, near the interior end 26 thereof, is an annular seat 27. The annular seat 27 surrounds an opening having a wall 28 which defines the inner orifice 23 of the pressure valve, that is, the orifice facing the inside of the tank.

The annular seat 27 shown in FIG. 5 is formed by an integral flange-like structure which projects inwardly from the valve cylinder walls 25 at the interior end 26 of the valve. Alternatively, the annular seat may be formed in other manners, such as by an annular ring inside the valve passageway having a peripheral O-ring which prevents fuel from escaping between the annular ring and the inner surface of the pressure relief valve wall 25 into the valve passageway. In such an embodiment, the annular ring must be maintained in its proper position with respect to the cylindrical portion of the valve. This may be accomplished by the placement of an annular groove in the inner wall of the cylindrical portion, adjacent to the annular ring, and the placement of a lock ring in the annular groove to prevent movement of the annular ring out of the valve passageway.

The pressure relief valve 17 further includes a seal 29 which is adapted to be pressed against the annular seat 27 to close and seal the inner orifice 23, and a means for yieldably biasing the seal 29 against the seat 27. In an alternate embodiment as described above, in which the annular seat 27 is formed by an annular ring with a peripheral O-ring, this biasing would also serve to prevent movement of the annular ring into the valve passageway. The yieldable biasing means of the pressure relief valve 17 as shown in FIGS. 4, 5, 8, and 9 includes an annular shelf 30 which extends radially inwardly from the wall of the cylindrical portion of the pressure relief valve 25 at the exterior end 31 of the valve 17, and a compression spring 32 which extends between, and presses against, the shelf 30 and the seal 29 to hold the seal 29 against the seat 27. The annular shelf 30 shown in FIG. 5 is located at the exterior end 31 of the pressure relief valve 17, but alternatively could be located more interiorly within the cylindrical portion of the valve 25, as long as the annular shelf 30 is located far enough from the seat 27 so that a compression spring can effectively yieldably bias the seal 29 against the seat 27. Other conventional biasing means could also be used to bias the seal 29 against the seat 27.

The seal 29 includes prongs 28 which extend out of the valve end of the seal and abut the wall 33 to maintain the seal 29 in axial alignment with the orifice 23. The seal 29 will therefore always be seated properly on the annular seat 27 to seal the orifice 23.

In the embodiment shown in FIGS. 4 and 5, the pressure relief valve 17 is mounted inside the fuel tank 12. An annular flange 49 which extends radially outwardly from the exterior end 50 of the cylindrical valve wall 25, and is connected to the outside of the fuel tank wall 18 around the relief port 15 so that the pressure relief valve is located substantially within the interior 21 of the tank 12. A circular gasket 52 is used to seal the connection between the valve flange and tank wall. As shown in FIG. 5, a base ring 51, which is connected to the tank wall 18, surrounds the relief port 15. The circular gasket 52 is placed between the base ring 51 and the annular flange 49 so that a portion 54 of the circular gasket 52 protrudes between the base ring 51 and the wall 18 which forms the relief port 15. Bolts 55 are used to fasten the annular flange 49 to the base ring 51 with the circular gasket 52 therebetween. Other means may be used for sealing the pressure relief valve 17 within the relief port 15.

Figure 9:
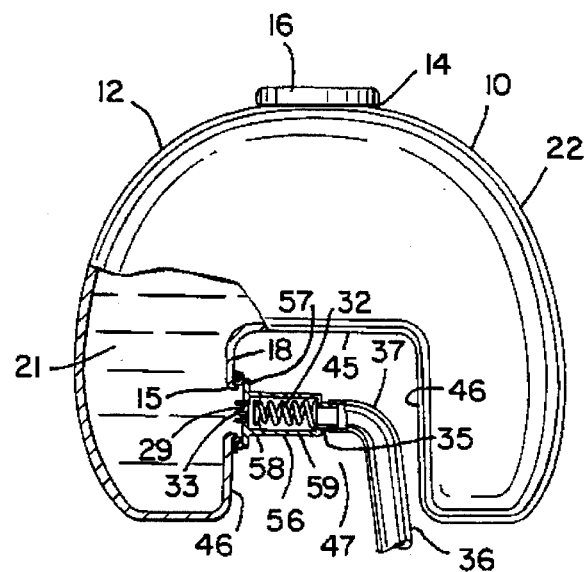
FIG. 9 is a cross-sectional view of the improved fuel system adapted for use with a saddle-type fuel tank with a pressure relief valve located outside the fuel tank.

The pressure relief valve may also be mounted externally to the fuel tank, as shown for exemplification in FIG. 9. Such a pressure relief valve 56 includes an annular flange 57 which extends radially outward from the end 58 of the cylindrical valve wall 59. This flange 57 is connected to the fuel tank wall 18 around the relief port 15 so that the pressure relief valve 56 is located entirely external to the fuel tank 12. The pressure relief valve 56 of FIG. 9 is otherwise similarly constructed to the pressure relief valve 10 of FIG. 5.

The conduit 20 includes a passageway outlet 35 formed at the exterior end 31 of the valve 17. A preferred conduit further includes a hose 36 which at one end 37 is connected to the passageway outlet 35 as shown in FIG. 3. The outlet end 38 of the hose 36 is preferably at a position which is away from the rider, away from the probable collision ejection path of the rider, and away from hot engine parts which might ignite ejected fuel in a collision. Preferably, the hose 36 is fastened to the motorcycle near the hose outlet end 38. In the embodiment shown in FIG. 1, the outlet end 38 of the hose 36 is preferably located at a lower rear portion 40 of the motorcycle 11 near the hub of the rear wheel so that fuel which is expelled from the fuel tank 12 through the conduit 20 flows onto a portion of the ground below the lower rear portion 40 of the motorcycle 11. The hose 36 may be secured to a rear wheel support strut 86 of the motorcycle to hold the outlet end 38 in proper position. If the hose 36 is rigid (e.g., metal) the hose may be secured to the frame 81 of the motorcycle (by conventional clamps, etc.) to thereby hold the outlet end 38 in position near the rear wheel 83. Preferably, the outlet 38 is located behind and below the normal position of the rider.

Figure 10:
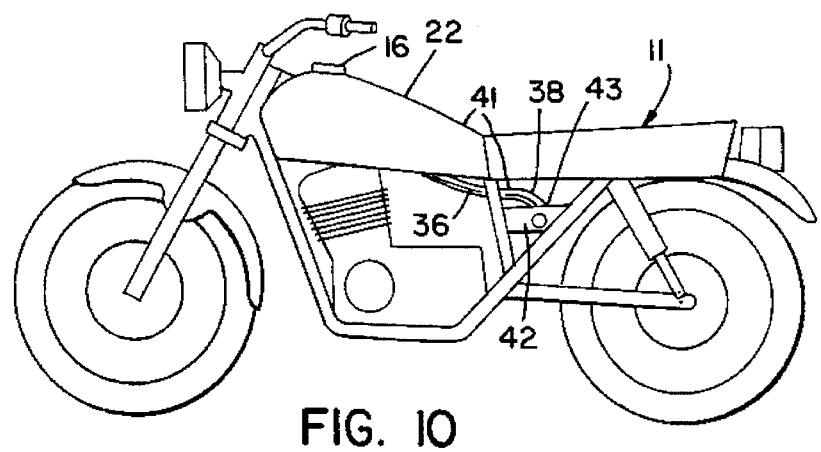
FIG. 10 is a side view of a motorcycle having the improved fuel system of the present invention which includes a remote reservoir to which the fuel directing hose is connected.

As shown in FIG. 10, the improved fuel system 41 may include a remote reservoir 42 mounted to the frame 81 having an inlet port 43 to which the end 38 of the hose 36 is connected so that fuel which is expelled from the fuel tank 12 through the pressure relief valve 17 flows through the hose 36 into the remote reservoir 42. The remote reservoir 42 must have a vent for air to escape as fuel enters the reservoir 42 through the hose 36.

In operation, the improved fuel system 10 provides for pressure relief of the fuel within the tank when needed, while preventing any escaping fuel from being directed toward the rider. In a collision, pressure may build up within the fuel tank 12 in any of several different ways. The fuel tank 12 may be impacted by a stationary or moving object during the collision which crushes the tank and creates an instantaneous build-up of pressure within the fuel tank 12. When the fuel tank 12 is located in front of the rider, as shown in FIGS. 1 and 10, and a front end collision occurs, the rider is often ejected in a frontward path so that the rider impacts and crushes the tank with his/her body. Pressure may also build up in the tank merely by the rapid deceleration accompanying a collision.

When the pressure within the tank 12 builds up to a predetermined super-atmospheric level, the pressure drives the seal 29 away from the annular seat so that the orifice 23 is opened to allow fuel to pour into the passageway 19 of the pressure relief valve 17. The seal 29 is forced away from the seat 27 a distance which is dependent on the internal tank pressure. Greater internal tank pressure will force the seal 29 away from the seat 27 a greater distance so that a larger flow of fuel may escape from the tank 12 into the passageway 19. The fuel continues out through the passageway outlet 35 into the hose 36 to the outlet end 38 of the hose 36 where the fuel is either discharged onto the ground or into the remote reservoir 42. The yieldable biasing means, such as the spring 32, which biases the seal 29 against the annular seat 27 determines the amount of internal tank pressure necessary to open the pressure valve. It should be resistant enough to compression so that pressure build-up within the fuel tank 12 due to normal temperature increases does not cause fuel to exit the tank 12 through the valve 17. The compression spring 32 should therefore press the seal 29 against the annular seat 27 with a force which is at least equal to the fuel vapor pressure at the normal high temperature which the fuel tank 12 is expected to reach in the climates where the motorcycle, or other vehicle, is used.

The improved fuel system 10 also preferably provides a venting function which allows air to enter the fuel tank 12 as fuel is consumed, without any substantial danger of fuel loss through the vent, and particularly without any danger that fuel will escape through the vent in the direction of the rider. With such a vent provided, the filler cap is not vented and forms an air tight and liquid tight seal to the tank. As shown in FIGS. 3–5, the improved fuel system preferably includes a vent pipe 63 having one end 64 which is connected to a small aperture 65 in the cylindrical conduit portion of the pressure valve which extends into the interior 21 of the fuel tank 12. The other end 66 of the vent pipe 63 is preferably located above a fill line 68 in the air space 69 within the tank 12 above the level of the fuel. The second end 66 of the vent pipe 63 includes a one-way valve 70 which allows air to flow through the pipe 63 substantially only in a direction from the valve passageway 19 of the conduit 20 into the air space 69. The passageway 19 of the pressure relief valve 17 is open to the exterior 22 of the fuel tank 12. Air can enter into the passageway 19 through conduit 20 from the open end 38 of the hose 36 or through the vented remote reservoir 42 and the hose 36 if a remote reservoir is used. As fuel is consumed within the fuel tank 12, air will pass from the passageway 19 through the small aperture 65, the vent pipe 63 and the one-way valve 70 into the fuel tank 12. As fuel is consumed, more air enters the fuel tank 12 to replace the volume formerly taken up by fuel. Since the valve 70 is a one-way valve, fuel will not spill out through the vent pipe 63 into the passageway 19 of the conduit 20 even when the motorcycle falls on its side or decelerates rapidly. However, even if some fuel should incidentally get through the one way valve 70, it will not spill on the rider or hot engine parts but will be carried away by the hose 36.

The improved fuel system of this invention is adaptable to many fuel tank configurations. The popular saddle-type fuel tank 12 has a raised bottom wall 45 and two inner side walls 46 connected to the raised bottom wall 45 to form a recess 47 as shown in FIGS. 3 and 4. The relief port 15 may be formed in one of the inner side walls 46 so that the passageway outlet 35 is directed toward the recess as shown in FIG. 4 and 5, and alternatively, FIG. 9. In this position the pressure relief valve 17 is completely hidden from view and is easily connected to a conduit such as the hose 36.

Figure 6:
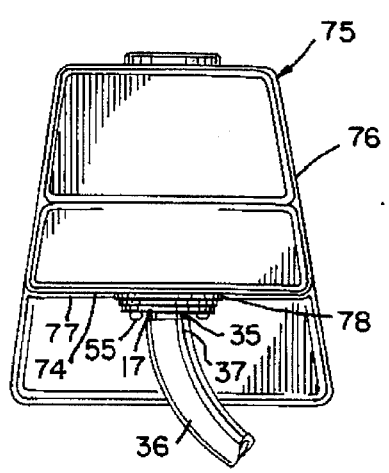
FIG. 6 is a front view of the improved fuel system which has been adapted for use with a non-saddle-type fuel tank.
Figure 7:
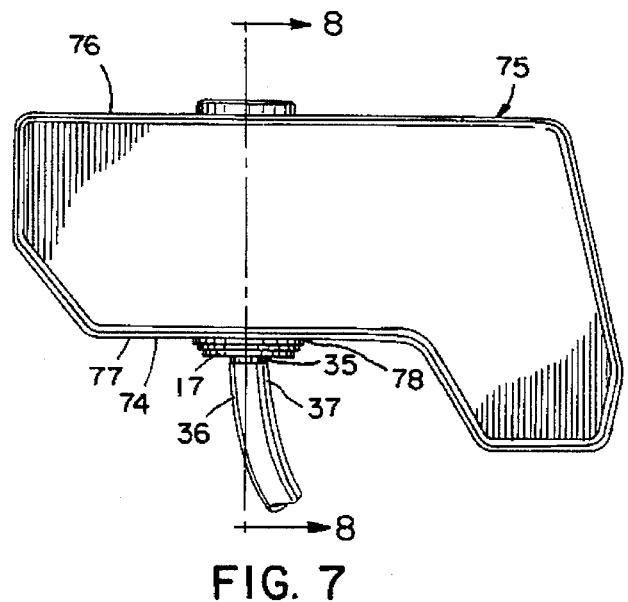
FIG. 7 is a side view of the improved fuel system as adapted for use with a non-saddle-type design fuel tank.
Figure 8:
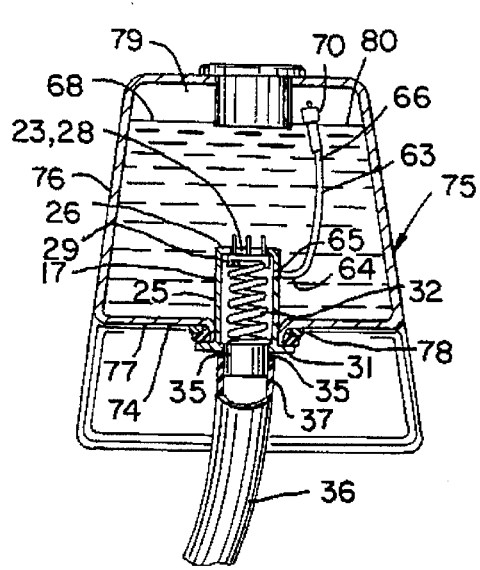
FIG. 8 is a cross-section view taken generally along line 8—8 of FIG. 7.

FIGS. 6–8 show an improved fuel system 75 used in connection with a fuel tank 76 which is not of the saddle-type design. (Parts shown in FIGS. 6–8 which are substantially identical to those shown in FIGS. 1–5 are numbered with the same numbers as used in FIGS. 1–5.) The fuel tank 76 includes a bottom wall 77 with a separate relief port 78 formed therein, so that the passageway outlet 35 formed at the exterior end 31 of the pressure relief valve 17 is directed downward. The relief valve 17 is sealed to the wall 74 of the fuel tank 76 around the relief port 78. The improved fuel system 75 as shown in FIGS. 6–8 is similar to the improved fuel system 10 shown in FIGS. 1–5, except that, since the fuel tank 76 is shaped differently the relief port 78 is preferably located in the bottom wall 77. In this position, the pressure relief valve 17 is substantially hidden from view. The vent pipe 63 extends from a small aperture 65 in the cylindrical wall of the pressure valve 17 to a one-way valve 70 which is located in the air space 79 above the fuel tank fill line 80 as shown in FIG. 8. The improved fuel system 75 may additionally include a remote reservoir as described above which would be attached to the outlet end 38 of the hose 36. Alternatively, since the pressure relief valve 17 is directed downwardly, in appropriate circumstances there may be no need for a hose 36 or a reservoir 42. The placement of the pressure relief valve 17 itself and its body may form a sufficient conduit for directing escaping fuel away from the rider.

The improved fuel system 75 shown in FIGS. 6–8 operates in much the same fashion as does the improved fuel system shown in FIGS. 1–5, except that fuel exits through the pressure relief valve 17 located in a relief port 78 in the bottom wall 77 of the fuel tank 76.

Although in the embodiments shown the improved fuel system pressure relief valve 17 is located in the inner side wall 46 (of a saddle-type design 12) or in the bottom wall 77 (of a non-saddle-type design 75) of a fuel tank, the relief valve 17 could be fitted to another wall of the fuel tank. Aesthetic factors may be taken into consideration when determining the placement of the pressure relief valve since it generally is preferable that it not be visible. If the motorcycle or vehicle has material which provides external fuel tank puncture protection, the pressure relief valve 17 may be fitted beneath this protective layer, on the top wall or side wall of the fuel tank, without affecting appearance. Where space and aesthetic concerns permit, the pressure relief valve may be mounted on the outside of the fuel tank as shown in FIG. 9. This type of pressure relief valve mounting 56 may also be used with the fuel tank 76 shown in FIGS. 6–8, and with other fuel tanks as well.

Though described with respect to a motorcycle it must be noted that the improved fuel system of the present invention can be used on a variety of vehicles which have exposed fuel system components and in which there is a commensurate danger of fuel spilling on the rider as a result of collision. These include, for example, all terrain type vehicles which have more than two wheels.

It is to be understood that the invention is not confined to the particular construction and arrangements herein illustrated and described, but embraces such modified forms thereof as come within the scope of the following claims.

What is claimed is:

1. A fuel system for motor vehicles having fuel system components exposed to a rider and to an engine of the motor vehicle, comprising:
   (a) a fuel tank having a fueling port and a separate relief port spaced entirely away from the fueling port;
   (b) a cap for closing and sealing the fueling port;
   (c) a pressure relief valve mounted to the fuel tank for closing and opening the relief port, the pressure relief valve normally closing the relief port but rapidly opening the relief port to allow fuel to flow from the tank through the relief port when pressure within the tank suddenly exceeds a predetermined super-atmospheric level due to a collision; and
   (d) a conduit directing fuel from the relief port away from the fuel tank when the relief valve is open to a position away from a rider of the vehicle, away from a forward upper portion of the vehicle, and away from the engine of the vehicle.

2. The fuel system of claim 1 wherein the fuel tank is of a saddle-type design which includes a raised bottom wall and two inner side walls connected to the raised bottom wall to form a recess.

3. The fuel system of claim 2 wherein the separate relief port is formed in one of the inner side walls of the tank so that a passageway outlet formed at an exterior end of the pressure relief valve is directed toward the recess.

4. The fuel system of claim 1 wherein the fuel tank is of a non-saddle-type design which includes a bottom wall.

5. The fuel system of claim 4 wherein the separate relief port is formed in the bottom wall of the tank so that a passageway outlet formed at an exterior end of the pressure relief valve is directed downwardly.

6. The fuel system of claim 1 wherein the pressure relief valve is located outside of the fuel tank.

7. The fuel system of claim 1 wherein the pressure relief valve is located substantially within the interior of the fuel tank.

8. The fuel system of claim 1 wherein the conduit includes a hose with a first end and an outlet end and which at the first end is connected to a passageway outlet of the pressure relief valve, and which at the outlet end is connected to the motor vehicle in a location which is remote from the rider, from the forward upper portion of the vehicle, and from the engine of the vehicle.

9. The fuel system of claim 8 further including a reservoir connected to the motor vehicle and located away from the position of the vehicle rider and having an inlet port to which the outlet end of the hose is connected so that fuel which is expelled from the fuel tank through the pressure relief valve flows through the hose into the remote reservoir.

10. A fuel system for motor vehicles having fuel system components exposed to a rider of the motor vehicle, comprising:
    (a) a fuel tank having a fueling port and a separate relief port;
    (b) a cap for closing and sealing the fueling port;
    (c) a pressure relief valve mounted to the fuel tank and located substantially within the fuel tank for closing and opening the relief port, the pressure relief valve normally closing the relief port but opening the relief port to allow fuel to flow from the tank through the relief port when pressure within the tank exceeds a predetermined super-atmospheric level, the pressure relief valve having a small aperture which extends from a passageway therein to the interior of the fuel tank and including a vent pipe having a first end which is registered with the small aperture and a second end located above a fill line in an air space within the fuel tank and a one-way valve mounted to the second end of the pipe which allows air to flow through the pipe substantially only in a direction from the pressure relief valve passageway into the air space, so that air can flow into the tank from the exterior thereof to replace a volume of consumed fuel; and
    (d) a conduit directing fuel from the relief port when the relief valve is open to a position away from a rider of the vehicle.

11. A fuel system for motor vehicles having fuel system components exposed to a rider of the motor vehicle, comprising:
    (a) a fuel tank having a fueling port and a separate relief port;
    (b) a cap for closing and sealing the fueling port;
    (c) a pressure relief valve mounted to the fuel tank for closing and opening the relief port, the pressure relief valve normally closing the relief port but opening the relief port to allow fuel to flow from the tank through the relief port when pressure within the tank exceeds a predetermined super-atmospheric level, the pressure relief valve including a cylindrical passageway portion with an interior end and an exterior end which is axially aligned with a central axis of the relief port, an annular seat with a central orifice located within the cylindrical passageway and near the interior end thereof, a seal which is adapted to be pressed against the annular seat to close and seal the orifice, means for yieldably biasing the seal against the seat in response to a pressure differential across the seal, and a passageway outlet formed at the exterior end of the pressure relief valve passageway; and
    (d) a conduit directing fuel from the relief port when the relief valve is open to a position away from a rider of the vehicle.

12. The fuel system of claim 9 wherein the yieldable biasing means of the pressure relief valve is a compression spring.

13. The fuel system of claim 9 wherein the seal includes prongs which extend outwardly from the relief valve passageway and abut the annular seat to maintain the seal in axial alignment with the orifice.

14. An improved motorcycle fuel system for use on a motorcycle having a frame and front and rear wheels, comprising:
    (a) a fuel tank mounted to the frame of the motorcycle, having a fueling port and a separate relief port;
    (b) a cap for closing and sealing the fueling port;
    (c) a pressure relief valve mounted to the fuel tank for closing and opening the relief port, the pressure relief valve normally closing the relief port but opening the relief port to allow fuel to flow from the tank through the relief port when pressure within the tank exceeds a predetermined super-atmospheric level;

(d) a conduit directing fuel from the relief port including a hose connected at one end to the valve to receive fuel passed through the relief port and an outlet end at which fuel is discharged from the hose at a position away from the rider of the motorcycle; and (e) a vent pipe extending from communication with the conduit into the fuel tank to an upper portion of the fuel tank and a one-way valve connected to the vent pipe to allow flow through the vent pipe only from the conduit to the interior of the tank.

15. The improved motorcycle fuel system of claim 14 wherein the pressure relief valve is located outside of the fuel tank.

16. The improved motorcycle fuel system of claim 14 wherein the pressure relief valve is located substantially within the interior of the fuel tank.

17. The improved motorcycle fuel system of claim 16 wherein the pressure relief valve has a small aperture which extends from a passageway therein to the interior of the fuel tank, and wherein the vent pipe has a first end which is registered with the small aperture and a second end located above a fill line in an air space within the fuel tank, the one-way valve mounted to the second end of the pipe to allow air to flow through the pipe substantially only in a direction from the pressure relief valve passageway into the air space, so that air can flow into the tank from the exterior thereof to replace a volume of consumed fuel.

18. The improved motorcycle fuel system of claim 14 wherein the pressure relief valve includes a cylindrical passageway portion with an interior end and an exterior end which is axially aligned with a central axis of the relief port, an annular seat with a central orifice located within the cylindrical passageway and near the interior end thereof, a seal which is adapted to be pressed against the annular seat to close and seal the orifice, means for yieldably biasing the seal against the seat in response to a pressure differential across the seal, and a passageway outlet formed at the exterior end of the pressure relief valve passageway.

19. The improved motorcycle fuel system of claim 18 wherein the yieldable biasing means of the pressure relief valve is a compression spring.

20. The improved motorcycle fuel system of claim 18 wherein the seal includes prongs which extend outwardly from the relief valve passageway and abut the annular seat to maintain the seal in axial alignment with the orifice.

21. The improved motorcycle fuel system of claim 14 wherein the outlet end of the hose is connected to a lower rear portion of the motorcycle so that fuel which is expelled from the fuel tank through the pressure relief valve flows onto a portion of ground below the lower rear portion of the motorcycle.

22. The improved motorcycle fuel system of claim 14 further including a remote reservoir located away from a rider and having an inlet port to which the outlet end of the hose is connected so that fuel which is expelled from the fuel tank through the pressure relief valve flows through the hose into the remote reservoir.

* * * * *

UNITED STATES PATENT AND TRADEMARK OFFICE
CERTIFICATE OF CORRECTION

PATENT NO. : 5,542,706
DATED : August 6, 1996
INVENTOR(S) : Kris D. Kubly

It is certified that error appears in the above-indentified patent and that said Letters Patent is hereby corrected as shown below:

In column 4, line 9 of the patent, "prongs 28" should be --prongs 33-- as written in the application on page 7, line 5.

In column 4, line 10 of the patent, "wall 33" should be --wall 28-- as per amendment dated November 29, 1995.

In column 8, line 49 (claim 12) of the patent, "claim 9" should be --claim 11-- as written in the application on page 15, line 1.

In column 8, line 52 (claim 13) of the patent, "claim 9" should be --claim 11-- as written in the application on page 15, line 6.

Signed and Sealed this

First Day of April, 1997

Attest:

BRUCE LEHMAN

*Attesting Officer*

*Commissioner of Patents and Trademarks*